No. 610,633. Patented Sept. 13, 1898.
J. MORLEY.
TIRE FOR VEHICLE WHEELS.
(Application filed May 14, 1898.)
(No Model.)
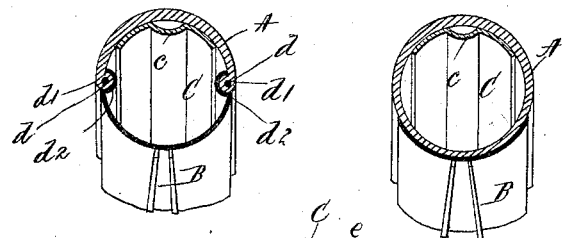
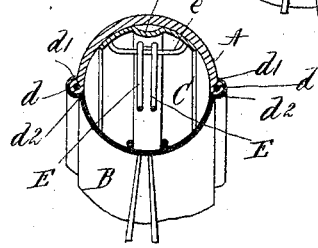
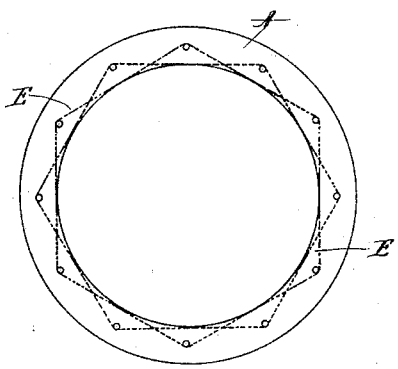
WITNESSES
John Buckler,
M. C. Knowles.
INVENTOR
James Morley,
BY
Edgar Tate &co.
ATTORNEYS.

UNITED STATES PATENT OFFICE.

JAMES MORLEY, OF BOURNEMOUTH, ENGLAND.

TIRE FOR VEHICLE-WHEELS.

SPECIFICATION forming part of Letters Patent No. 610,633, dated September 13, 1898.

Application filed May 14, 1898. Serial No. 680,707. (No model.)

*To all whom it may concern:*

Be it known that I, JAMES MORLEY, a subject of the Queen of Great Britain, residing at Bournemouth, in the county of Hants and Kingdom of England, have invented certain new and useful Improvements in Tires for the Wheels of Bicycles and other Vehicles, of which the following is a full and complete specification, such as will enable those skilled in the art to which it appertains to make and use the same.

This invention relates to tires for bicycles and other vehicles; and it has for its object to provide simple and improved means by which said tires will be rendered safe and immune from the effects of puncture and which will at the same time insure greater strength.

In carrying out my improvements I provide an improved construction and arrangement which will retain sufficient buoyancy to reduce vibration to a minimum and at the same time lessen friction and improve the draft by distributing the pressure over the whole rim and cover and reducing the point of contact, thus producing the same result with less expenditure of power or greater speed with the application of the same power.

The invention is the same as that for which complete Letters Patent were granted in Great Britain October 8, 1897, No. 23,106, and is fully disclosed in the following specification, of which the accompanying drawings form a part, in which the separate parts of my improvement are designated by the same letters of reference in each of the views, and in which—

Figure 1 is a transverse sectional view of a tire embodying my improvements. Fig. 2 is a corresponding view illustrating a modified construction. Fig. 3 is a corresponding view illustrating another form of the construction for carrying out my invention; and Fig. 4 is a side view of the tire illustrated in Fig. 3, showing in dotted lines the arrangement of the bracing-wires, metal tapes, or chains.

I employ in lieu of an inflated air-tube or pneumatic tire an elastic or semi-elastic tube or cover A. To distend this tube or cover, I insert therein a rim C, formed of metal, wood, or composite material and which is of segmental form in cross-section, the convex side thereof being directed outwardly. The convex surface of this rim C bears against the inner surface of the outer or tread portion of the tube or cover A, and said rim is provided at its longitudinal center with an inwardly-directed longitudinal groove $c$, whereby the flexibility or elasticity of the outer or bearing surface of the tube or cover A is increased. The tube or cover may be either of circular or cylindrical form in cross-section, as shown in Fig. 1, or it may be of part-circular cross-section, as shown in Figs. 2 and 3. It may be secured to the wheel-rim in any ordinary or desired manner.

In the construction illustrated in Fig. 1 the elastic or semi-elastic tube or cover A is of full - circular cross - section and is tightly pressed and secured against the wheel-rim B.

In the construction illustrated in Fig. 2 the tube or cover A is of part-circular contour in cross-section and is provided with longitudinal ribs $d'$ $d'$ at its end edges, which are received by corresponding recesses $d^2$ in the outer face of the edges of the wheel-rim B, the tube or cover being caused to grip the recesses in the rim and retain its position by means of wires $b$, embedded in its ribs or enlargements $d'$.

In the construction shown in Fig. 3 a part-circular tube or cover like that shown in Fig. 2 is correspondingly seated and fastened in recesses in the inside of the wheel-rim instead of at the outside. I have also illustrated a means for obtaining or enhancing the buoyancy, which consists of metal tapes, chains, or wires E, as shown in Figs. 3 and 4, which are preferably formed of metal and operate to distend the tire, said tapes, chains, or wires passing over fixed pins or studs $e$ upon the interior rim or band C and resting on the wheel-rim B, while at the same time they prevent the two rims C and B from coming in contact with each other.

The operation and advantages of my invention will be readily understood by those skilled in the art to which it appertains. The improved construction and arrangement as comprised in my invention renders the tires free from the ill effects arising from bursts, punctures, or leakages, reduces the cost, lessens vibration, and improves the draft.

It will be understood that various manifest modifications may be made without departing from the spirit and scope of my invention.

Having fully described my invention, I claim as new and desire to secure by Letters Patent—

An improved tire for the wheels of bicycles and similar vehicles, comprising an elastic or semi-elastic tube or cover and an interior rim or band which bears on the inner surface of the outer portion of said tube or cover, and is adapted to expand the same, said rim or band being segmental in cross-section and the convex surface thereof being directed outwardly and being provided centrally and longitudinally with an inwardly-directed groove, and said rim or band being provided at the inner surface thereof with a plurality of tangentially-arranged brace-rods which are connected therewith at each end and which are supported centrally by the rim of the wheel with which the tire is connected, substantially as shown and described.

In testimony that I claim the foregoing as my invention I have signed my name, in presence of the subscribing witnesses, this 2d day of May, 1898.

JAMES MORLEY.

Witnesses:
ROBERT SIDNEY PAYNE,
ROBERT DOUGLAS GREENHILL.